United States Patent
Ryan (10) Patent No.: US 12,093,304 B2
(45) Date of Patent: Sep. 17, 2024

(54) IMAGE SAMPLING TECHNOLOGIES FOR AUTOMATED VISUAL INSPECTION SYSTEMS

(71) Applicant: AMGEN INC., Thousand Oaks, CA (US)

(72) Inventor: Killian Ryan, Dublin (IE)

(73) Assignee: AMGEN INC., Thousand Oaks, CA (US)

( * ) Notice: Subject to any disclaimer, the term of this patent is extended or adjusted under 35 U.S.C. 154(b) by 846 days.

(21) Appl. No.: 17/279,803

(22) PCT Filed: Aug. 19, 2019

(86) PCT No.: PCT/US2019/047023
§ 371 (c)(1),
(2) Date: Mar. 25, 2021

(87) PCT Pub. No.: WO2020/068298
PCT Pub. Date: Apr. 2, 2020

(65) Prior Publication Data
US 2021/0334930 A1     Oct. 28, 2021

Related U.S. Application Data

(60) Provisional application No. 62/736,975, filed on Sep. 26, 2018.

(51) Int. Cl.
*G06F 16/50* (2019.01)
*G06F 16/51* (2019.01)
*G06F 18/214* (2023.01)
*G06F 18/28* (2023.01)
(Continued)

(52) U.S. Cl.
CPC .............. *G06F 16/50* (2019.01); *G06F 16/51* (2019.01); *G06F 18/2148* (2023.01);
(Continued)

(58) Field of Classification Search
CPC ...... G06F 16/50; G06F 16/51; G06F 18/2148; G06F 18/28; G06T 1/0007; G06T 7/0004;
(Continued)

(56) References Cited

U.S. PATENT DOCUMENTS

6,434,413 B1   8/2002   Liu et al.
9,418,416 B2   8/2016   Milne et al.
(Continued)

OTHER PUBLICATIONS

Chinese Patent Application No. 2019800504574, First Office Action, issued Sep. 8, 2023.
(Continued)

*Primary Examiner* — Girumsew Wendmagegn
(74) *Attorney, Agent, or Firm* — MARSHALL, GERSTEIN & BORUN LLP (57) ABSTRACT

A method for sampling images includes receiving a first image set generated by automated imaging equipment during a first inspection period, and storing in a memory an image library that initially consists of the first image set. A plurality of new image sets is then sequentially received (302) during respective inspection periods. While the new image sets are received (302), the image library stored in the memory is updated. Updating the image library includes, for each new image set, adding to the image library a certain number of images distributed among the new image set and removing from the image library the same number of images distributed among a current instance of the image library (308). The number of overwritten images in the image library decreases from one inspection period to the next.

20 Claims, 6 Drawing Sheets

(51) Int. Cl.
  *G06T 1/00* (2006.01)
  *G06T 7/00* (2017.01)
  *G06V 10/772* (2022.01)
  *H04N 1/00* (2006.01)
  *H04N 5/00* (2011.01)
(52) U.S. Cl.
  CPC ............ *G06F 18/28* (2023.01); *G06T 1/0007* (2013.01); *G06T 7/0004* (2013.01); *G06V 10/772* (2022.01); *H04N 1/00* (2013.01); *H04N 1/0009* (2013.01); *H04N 5/00* (2013.01); *G06T 2207/20081* (2013.01); *G06T 2207/20084* (2013.01); *G06V 2201/06* (2022.01)
(58) Field of Classification Search
  CPC ........... G06T 2207/20081; G06T 2207/20084; G06V 10/772; G06V 2201/06; G06V 10/7747; H04N 1/00; H04N 1/0009; H04N 5/00
  See application file for complete search history.

(56) References Cited

U.S. PATENT DOCUMENTS

| | | | |
|---|---|---|---|
| 2004/0003149 A1* | 1/2004 | Engel | G06F 5/14 710/54 |
| 2010/0138529 A1 | 6/2010 | Duffield et al. | |
| 2011/0026804 A1 | 2/2011 | Jahanbin et al. | |
| 2011/0313977 A1 | 12/2011 | Al-Kateb et al. | |
| 2018/0032586 A1 | 2/2018 | Yu et al. | |
| 2018/0181621 A1* | 6/2018 | Al-Kateb | G06F 16/24568 |

OTHER PUBLICATIONS

Jefrey S. Vitter, "Random Sampling with a Reservoir", ACM Transactions on Mathematical Software, vol. 11, No. 1, Mar. 1985, pp. 37-57.
Search Report and Written Opinion in International Application No. PCT/US2019/047023 dated Nov. 15, 2019, 16 pages.

* cited by examiner

FIG. 1

| SEQUENCE # WITHIN NEWEST IMAGE SET \ INSPECTION PERIOD / IMAGE SET # | 1 | 2 | 3 | 4 | 5 | 6 | 7 | 8 | 9 | 10 | 11 | 12 | 13 | 14 | 15 | 16 ... |
|---|---|---|---|---|---|---|---|---|---|---|---|---|---|---|---|---|
| 1 | 1 | 251 | 501 | 751 | 1001 | 1251 | 1501 | 1751 | 2001 | 2251 | 2501 | 2751 | 3001 | 3251 | 3501 | 3751 |
| 2 | 2 | 252 | 501 | 752 | 1002 | 1252 | 1502 | 1752 | 2002 | 2252 | 2502 | 2752 | 3002 | 3252 | 3502 | 3752 |
| 3 | 3 | 253 | 501 | 753 | 1003 | 1253 | 1503 | 1753 | 2003 | 2253 | 2503 | 2753 | 3003 | 3253 | 3503 | 3753 |
| 4 | 4 | 254 | 501 | 754 | 1004 | 1254 | 1504 | 1754 | 2004 | 2254 | 2504 | 2754 | 3004 | 3254 | 3504 | 3754 |
| 5 | 5 | 255 | 501 | 755 | 1005 | 1255 | 1505 | 1755 | 2005 | 2255 | 2505 | 2755 | 3005 | 3255 | 3505 | 3755 |
| 6 | 6 | 256 | 501 | 756 | 1006 | 1256 | 1506 | 1756 | 2006 | 2256 | 2506 | 2756 | 3006 | 3256 | 3506 | 3756 |
| 7 | 7 | 257 | 501 | 757 | 1007 | 1257 | 1507 | 1757 | 2007 | 2257 | 2507 | 2757 | 3007 | 3257 | 3507 | 3757 |
| 8 | 8 | 258 | 501 | 758 | 1008 | 1258 | 1508 | 1758 | 2008 | 2258 | 2508 | 2758 | 3008 | 3258 | 3508 | 3758 |
| 9 | 9 | 259 | 501 | 759 | 1009 | 1259 | 1509 | 1759 | 2009 | 2259 | 2509 | 2759 | 3009 | 3259 | 3509 | 3759 |
| 10 | 10 | 260 | 501 | 760 | 1010 | 1260 | 1510 | 1760 | 2010 | 2260 | 2510 | 2760 | 3010 | 3260 | 3510 | 3760 |
| 11 | 11 | 261 | 501 | 761 | 1011 | 1261 | 1511 | 1761 | 2011 | 2261 | 2511 | 2761 | 3011 | 3261 | 3511 | 3761 |
| 12 | 12 | 262 | 501 | 762 | 1012 | 1262 | 1512 | 1762 | 2012 | 2262 | 2512 | 2762 | 3012 | 3262 | 3512 | 3762 |
| 13 | 13 | 263 | 501 | 763 | 1013 | 1263 | 1513 | 1763 | 2013 | 2263 | 2513 | 2763 | 3013 | 3263 | 3513 | 3763 |
| 14 | 14 | 264 | 501 | 764 | 1014 | 1264 | 1514 | 1764 | 2014 | 2264 | 2514 | 2764 | 3014 | 3264 | 3514 | 3764 |
| 15 | 15 | 265 | 501 | 765 | 1015 | 1265 | 1515 | 1765 | 2015 | 2265 | 2515 | 2765 | 3015 | 3265 | 3515 | 3765 |
| 16 | 16 | 266 | 501 | 766 | 1016 | 1266 | 1516 | 1766 | 2016 | 2266 | 2516 | 2766 | 3016 | 3266 | 3516 | 3766 |

FIG. 4

IMAGE SAMPLING TECHNOLOGIES FOR AUTOMATED VISUAL INSPECTION SYSTEMS

CROSS-REFERENCE TO RELATED APPLICATION

Priority is claimed to U.S. Provisional Patent Application No. 62/736,975, filed Jul. 26, 2018, the entire contents of which are hereby incorporated by reference.

FIELD OF THE DISCLOSURE

The present application relates generally to automated visual inspection systems, such as those used for analysis of pharmaceutical products for quality control purposes, and more specifically relates to techniques for sampling images generated by automated imaging equipment.

BACKGROUND

Pharmaceutical products can be inspected manually (i.e., by human eyes) or, far more efficiently, by automated visual inspection systems. For automated systems, visual inspection recipes (algorithms, etc.) may be complex, and development of the inspection recipes may require many sample images in order to fine-tune the automated inspection process. In particular, automated visual inspection systems may employ machine-learning models that, if stringent quality control standards are to be satisfied, must be trained using a large collection of training images. After initial recipe development, additional images may be saved during run-time operation (e.g., while processing production lots), and used to fine tune and/or troubleshoot the inspection recipe. There may be millions of these additional images for a single production lot, giving rise to massive storage requirements. For example, if eight cameras each capture 20 images of a sample, a production lot includes 500,000 samples, and each image requires four megabytes (MB) of storage, the full set of images for just the one production lot would require 320 terabytes (TB) of storage space.

To reduce storage requirements, various sampling techniques have been used. For example, only the last (most recent) X images may be saved and analyzed, or only one out of every Y images may be saved and analyzed. The former technique (save only the most recent X images) can be advantageous in that it generally ensures that a full complement of samples is saved, even if visual inspection of the lot is interrupted prematurely. However, the technique does not save images across the entire lot, which can be problematic, for instance, if the samples and/or operating conditions vary at all over the course of inspecting the lot. The latter technique (save one of every Y images), on the other hand, collects samples from across the entire lot, but may not provide a full complement of samples if inspection of the lot is interrupted prematurely. This is problematic because premature interruption of the inspection process is not uncommon (e.g., if quality control procedures indicate that there are too many false positives and/or false negatives), particularly when developing a new algorithm for a new product.

Thus, there is a need for image sampling techniques that retain the advantages of both approaches described above, i.e., by obtaining samples from across the entire lot, while also having a full complement of samples even early in the inspection process. The diversity of samples would allow for more effective fine-tuning of the inspection model while the production lot is being inspected, and the availability of a full complement of samples would allow for more effective troubleshooting in the event that the inspection process is interrupted prematurely.

BRIEF SUMMARY

Embodiments described herein relate to systems and methods that improve upon conventional techniques for sampling images generated in an automated visual inspection system. During automated visual inspection, a full complement of images is initially saved to an image library (e.g., by saving the first X images, where X is a full complement). A "full complement" may be viewed as some minimum number of images (or image subsets) needed to adequately train a classification/prediction model, for example, or to adequately fine-tune or troubleshoot such a model, etc. A designer of the automated visual inspection system may choose the value of X accordingly.

As the visual inspection process continues, images in the image library are progressively replaced in a manner that satisfies (or substantially satisfies) two requirements throughout or substantially through the inspection process: (1) the image library contains a full complement of images (e.g., as soon as the first X images have been generated, if X is a full complement), and (2) the image library contains images distributed across the entire inspected lot (i.e., across the entire portion of the lot that has been inspected so far). In one such embodiment, when an n-th image set is received, every n-th image in the image library is replaced by the n-th image of the n-th image set, with the other images of the image library being left in place. For example, if a full complement is 250 images, all of the first 250 images may be saved. As images 251 through 500 become available, every second image of the saved images is replaced by every second image of images 251 through 500 (e.g., such that image number 252 replaces image number 2, image number 254 replaces image number 4, image number 256 replaces image number 256, and so on). As images 501 through 750 become available, every third image of the saved images is replaced by every third image of images 501 through 750 (e.g., such that image number 503 replaces image number 3, image number 506 replaces image number 256, and on on). This sampling process may repeat until the last set of 250 images (or some portion thereof) is generated, for example, or the process may be modified after the 250th image of the 250th set of images is generated, etc.

When such a technique is used, the image library provides a good distribution of images after each iteration/pass, and contains a full complement of images at least as soon as the first iteration/pass has finished. Moreover, these useful characteristics are maintained even after many iterations/passes.

Variations of this technique may also be used. For example, every n-th subset of two or more images in the image library may be replaced (e.g., with each subset corresponding to a different product sample, or a different imager perspective, etc.), rather than replacing every n-th image.

BRIEF DESCRIPTION OF THE DRAWINGS

The skilled artisan will understand that the figures, described herein, are included for purposes of illustration and are not limiting on the present disclosure. The drawings are not necessarily to scale, emphasis instead being placed upon illustrating the principles of the present disclosure. It is to be understood that, in some instances, various aspects of the described implementations may be shown exaggerated or enlarged to facilitate an understanding of the described implementations. In the drawings, like reference characters throughout the various drawings generally refer to functionally similar and/or structurally similar components.

DETAILED DESCRIPTION

The various concepts introduced above and discussed in greater detail below may be implemented in any of numerous ways, and the described concepts are not limited to any particular manner of implementation. Examples of implementations are provided for illustrative purposes.

Figure 1:
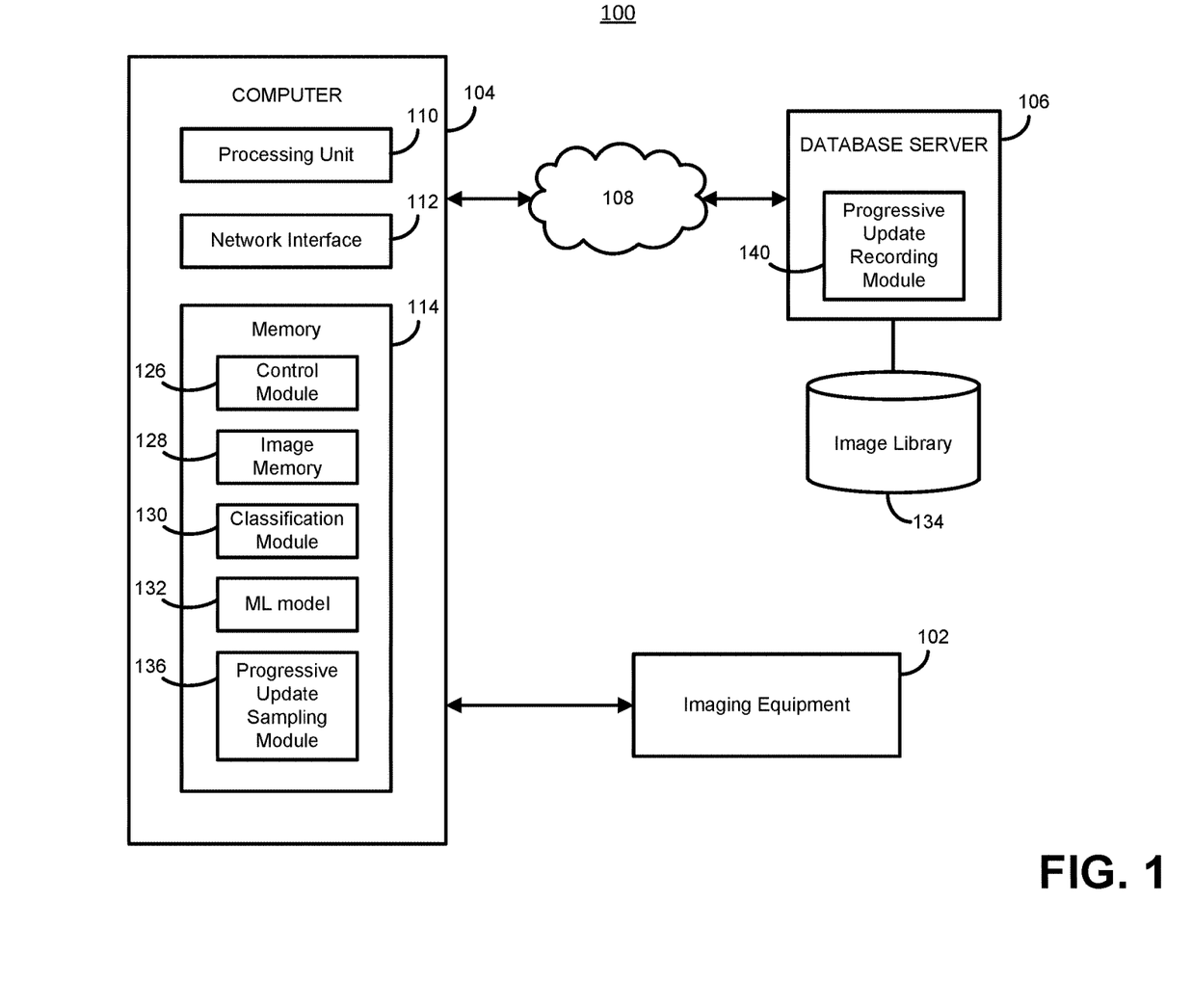
FIG. 1 is a simplified block diagram of an example automated visual inspection system that may implement the image sampling techniques described herein.

FIG. 1 is a simplified block diagram of an example automated visual inspection system 100 that may implement the image sampling techniques described herein. System 100 includes imaging equipment 102, a computer 104 communicatively coupled to imaging equipment 102, and a database server 106 communicatively coupled to computer 104 via a network 108. Network 108 may be a single communication network, or may include multiple communication networks of one or more types (e.g., one or more wired and/or wireless local area networks (LANs), and/or one or more wired and/or wireless wide area networks (WANs) such as the Internet).

Imaging equipment 102 may include one or more imagers (e.g., charge-coupled devices (CCDs)) and an optical system (e.g., one or more lenses, and possibly one or more mirrors, etc.) that are collectively configured to capture digital images of samples for visual inspection. The samples being inspected (not shown in FIG. 1) may be anything that can exhibit visual attributes or characteristics important to a particular application. In a pharmaceutical context, for example, the inspected samples may be syringes, vials or other vessels holding fluids (e.g., pharmaceutical products), where any given fluid may or may not contain undesired particles (or particles having certain visual attributes, etc.), and/or the inspected samples may be the vessels themselves, where any given vessel may or may not exhibit cracks and/or other defects. In such embodiments, the visual characteristics/attributes may be critical for purposes of satisfying quality control standards, for example. The samples may be sequentially presented to imaging equipment 102 in an automated manner, such as by using a motor-driven system controlled by computer 104 or another device or system.

Depending on the implementation, imaging equipment 102 may capture one image per sample, or multiple images per sample. For example, imaging equipment 102 may include three imagers (or 10 imagers, 20 imagers, etc.) each having a physical configuration that provides a different perspective of a particular sample. Each of the imagers may capture only a single image of each sample, or may capture multiple images of each sample over time (e.g., to generate a time-series of images that allows the tracking of particles over time, which may overcome problems due to potential occlusion of one or more particles at any given instant). Thus, for example, imaging equipment may capture one, two, three, 10, 20, 100 or any other suitable number of images per sample. The number of samples may also vary, e.g., depending on the size of a production lot that is currently being inspected.

Computer 104 is generally configured to automate/control imaging equipment 102, in order to analyze the images that are generated/captured by imaging equipment 102, and to transmit a sampling of those images to database server 106 for longer term storage. It is understood that in some alternative embodiments, these functions may instead be divided among two or more different computers, and/or one or more of these functions may instead be implemented by imaging equipment 102. As seen in FIG. 1, computer 104 includes a processing unit 110, a network interface 112 and a memory 114. Processing unit 110 includes one or more processors, each of which may be a programmable microprocessor that executes software instructions stored in memory 114 to execute some or all of the functions of computer 104 as described herein. Alternatively, one, some or all of the processors in processing unit 110 may be other types of processors (e.g., application-specific integrated circuits (ASICs), field-programmable gate arrays (FPGAs), etc.), and the functionality of computer 104 as described herein may instead be implemented, in part or in whole, in hardware.

Network interface 112 may include any suitable hardware (e.g., front-end transmitter and receiver hardware), firmware, and/or software configured to communicate via network 108 using one or more communication protocols. For example, network interface 112 may be or include an Ethernet interface, enabling computer 104 to communicate with database server 106 over the Internet or an intranet, etc.

Memory 114 may include one or more physical memory devices or units containing volatile and/or non-volatile memory. Any suitable memory type or types may be included, such as read-only memory (ROM), random access memory (RAM), flash memory, a solid-state drive (SSD), a hard disk drive (HDD), and so on. Collectively, memory 114 may store one or more software applications, data received/used by those applications, and data output/generated by those applications.

Memory 114 stores the software instructions of a control module 126 that, when executed by processing unit 110, causes control messages to be exchanged with imaging equipment 102. Control module 126 may generally be configured to automate operation of imaging equipment 102, such that images of samples can be collected with little or no human interaction. In particular, control module 126 may cause imaging equipment 102 to capture/generate a certain number of images per sample (possibly with automated rotation or other movement of one or more imagers, or of the sample itself, etc.), and may further cause imaging equipment 102 to send those images to computer 104. Computer 104 initially stores the received images in an image memory 128, which may be any suitable type of temporary storage (e.g., RAM) that allows computer 104 to analyze each image prior to its deletion. Image memory 128 may be overwritten each time a new image, or new subset of images, arrives from imaging equipment 102, for example.

Memory 114 stores the software instructions of a classification module 130 that, when executed by processing unit 110, classifies each sample (or more precisely, classifies one or more images of each sample) with respect to one or more sample attributes or characteristics. To this end, classification module 130 may train and implement a machine-learning (ML) model 132. For example, one or more images of a fluid sample may be input to ML model 132 and, after processing the image(s), ML model 132 may output a predicted number of particles in the fluid sample, and/or a distribution of particle or object types contained in the fluid sample, etc. ML model 132 may be any suitable type of machine-learning model, such as a linear regression model, a convolutional neural network, a recursive neural network, and so on. Alternatively, ML model 132 may instead comprise software instructions of a non-ML algorithm (i.e., vision analysis software) that performs classification functions without requiring any training. In some embodiments, classification module 130 also uses the output(s) of ML model 132 to determine whether a given sample should be rejected or accepted (or set aside for manual inspection, etc.). In alternative embodiments, the output of ML model 132 itself includes a classification directly indicative of whether the sample should be accepted or rejected (or set aside for further review, etc.), or a different module in memory 114 (or the memory of another computer in system 100, not shown in FIG. 1) determines whether the sample should be accepted or rejected.

ML model 132 may be trained in any suitable manner, such as by running trials in which images captured by imaging equipment 102 are manually labeled by humans reviewing the images, and used as training data. In addition to initially generating/training ML model 132, classification module 130 may maintain or "fine tune" ML model 132 based on additional images, e.g., while the inspection of a production lot is in progress. For instance, a quality control procedure may require that a limited collection of images captured by imaging equipment 102 be manually inspected and labeled by a human. Classification module 130 may then use these labeled images as additional training data to refine ML model 132. In some embodiments or scenarios, human inspection of certain images may also be used to determine whether the inspection process requires troubleshooting. For example, human inspection of images (and/or inspection of the samples themselves) may reveal an unacceptably large number of false positives and/or false negatives being output by ML model 132. In such a scenario, it may be necessary to stop and/or re-run the inspection of the production lot, after troubleshooting techniques are applied to ensure a more robust inspection process and a more accurate ML model 132. These troubleshooting techniques may be highly dependent on having a collection of images that is both sufficiently large in number and sufficiently diverse (e.g., well-distributed among the various samples that have been inspected up to that point).

To support fine tuning of ML model 132 and/or troubleshooting, database server 106 maintains an image library 134, stored in a memory (not shown in FIG. 1) within, or otherwise communicatively coupled to, database server 106. The memory may be a non-volatile, persistent memory, such as an HHD or SSD memory, for example. Ideally, all of the images captured by imaging equipment 102 would be stored in image library 134 and available for future use. Unfortunately, this may be impractical or expensive, due to the potentially huge number of images and their memory requirements, and/or due to the difficulty of moving images over network 108 at sufficiently high speeds. As noted above in the Background, for example, some inspection recipes may require hundreds of terabytes or more of storage for just a single production lot.

To reduce storage requirements, memory 114 of computer 104 stores the software instructions of a progressive update sampling module 136, which when executed by processing unit 110 selects/identifies only a limited subset of images from imaging equipment 102 for storage in image library 134. In one embodiment, progressive update sampling module 136 causes network interface 112 to transmit only these selected images to database server 106 (via network 108). Progressive update recording module 140 then stores each of the received images in image library 134. Progressive update recording module 140 also determines which old image to remove from image library 134 when adding a new image. In some embodiments, progressive update recording module 140 overwrites each new image at the memory location where the old image being removed resides. In other embodiments, no such correspondence is required (e.g., an image that is "removed" from image library 134 may still exist in memory for some time, but is no longer protected from being overwritten by new data).

Other embodiments are also possible. For example, computer 104 may forward/transmit all images from imaging equipment 102 to database server 106 via network 108, in which case progressive update sampling module 136 may reside in a memory of database server 106 rather than memory 114. Such an approach would generally require more traffic over network 108 than is necessary, however, and therefore may not be preferred. In another alternative embodiment, image library 134 is stored locally in memory 114 (or another local memory communicatively coupled to computer 104), and progressive update recording module 140 is included in memory 114 rather than a memory of database server 106 (e.g., such that computer 104 conducts the operations of database server 106 described herein that relate to storage and updates in image library 134). In this latter embodiment, system 100 may omit database server 106 and network 108.

The algorithm by which progressive update sampling module 136 and progressive update recording module 140 collectively determine which images to add to image library 134, and which images to remove from image library 134, may vary depending upon the specific embodiment. Generally, however, the algorithm seeks to ensure that image library 134 maintains at all times, or substantially all time (e.g., after at least some threshold number of images have initially been collected, etc.), a collection of images that is sufficiently large in number, and sufficiently diverse (e.g., well-distributed among the various images that have been collected to that point), to allow adequate refining of ML model 132 and/or troubleshooting. In some embodiments, for example, progressive update sampling module 136 and progressive update recording module 140 treat incoming images as discrete image "sets," with each image set having the same number of images as each other and image library 134. Progressive update sampling module 136 and progressive update recording module 140 may then collectively, for each image set that is received from imaging equipment 102, add to image library 134 a total of j images that are evenly or unevenly distributed among the image set, and remove from image library 134 a total of j images that are evenly or unevenly distributed among the current instance of image library 134, where j is a positive integer that decreases for each successive image set. Additionally, in some embodiments, the number of images separating each of the j images (in both the current image set and the current instance of image library 134) increases for each successive image set.

In one algorithm, for example, progressive update recording module 140 initially stores a full complement of X images in image library 134, e.g., by storing all of the first X images received by database server 106. As the second set of X images become available to computer 104, progressive update recording module 140 may replace every second image of image library 134 with every second image of that second set of images. The process may then repeat as the third set of X images become available to computer 104, with progressive update recording module 140 replacing every third image of image library 134 with every third image of that third set of images. Generally, as the n-th set of X images becomes available to computer 104, progressive update recording module 140 replaces the n-th image of image library 134 with every n-th image of that n-th set of images. In some embodiments, the updates to image library 134 for any given new image set occur incrementally, with progressive update sampling module 136 causing each selected image to be transmitted to database server 106 without waiting to receive the next image from imaging equipment 102, and/or with database server 106 adding the new image to image library 134 (and removing the old image from image library 134) without waiting to receive the next image from computer 104. In other embodiments, a batch processing approach is used in which progressive update sampling module 136 sends all selected images (e.g., every second image in the second image set) to database server 106 only after the entire current image set has been received by computer 104, and progressive update recording module 140 performs all of the replacement operations for that image set at that time.

Figure 2A:
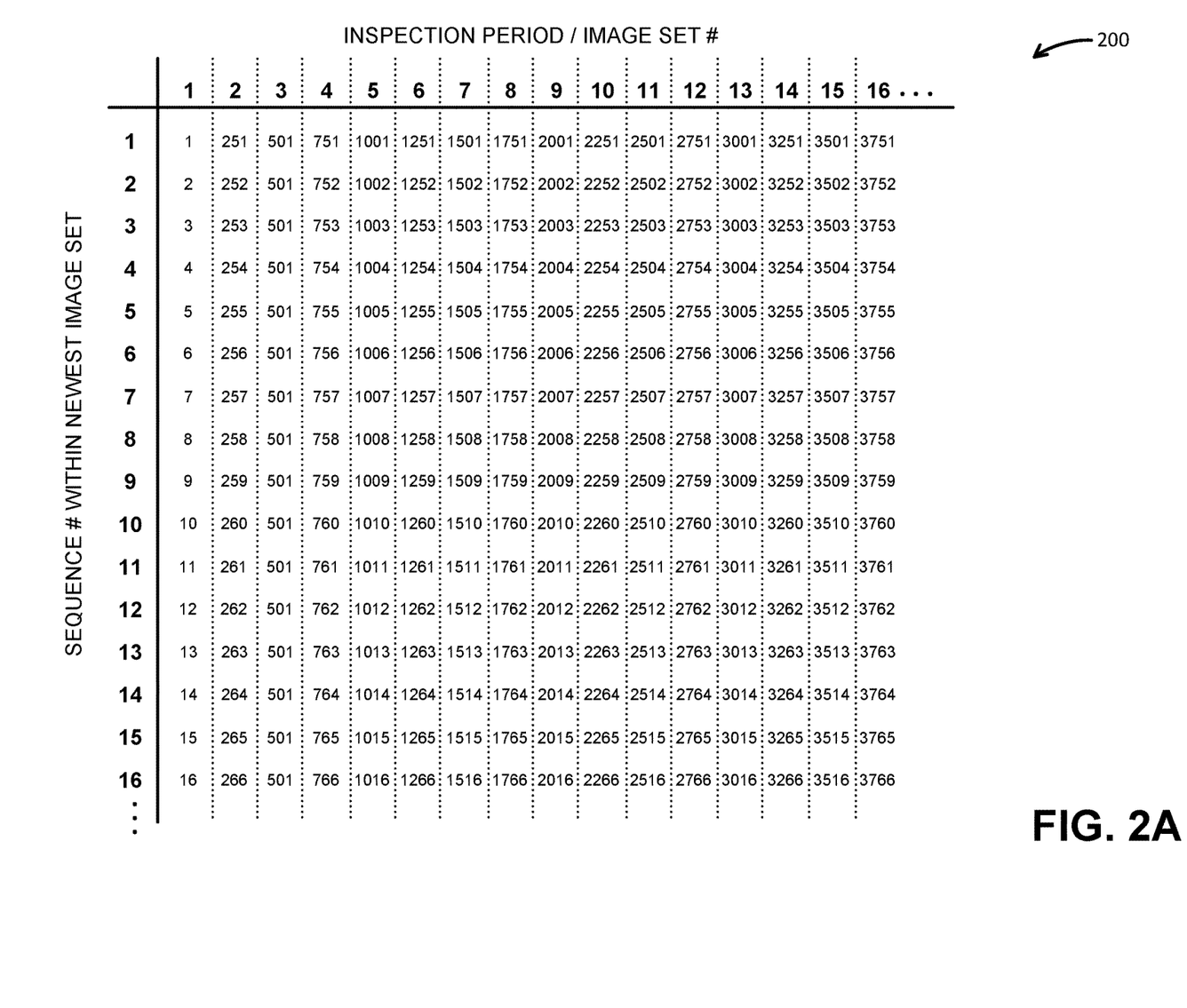
FIG. 2A is a table showing an example series of successive image sets that may be generated in the automated visual inspection system of FIG. 1.
Figure 2B:
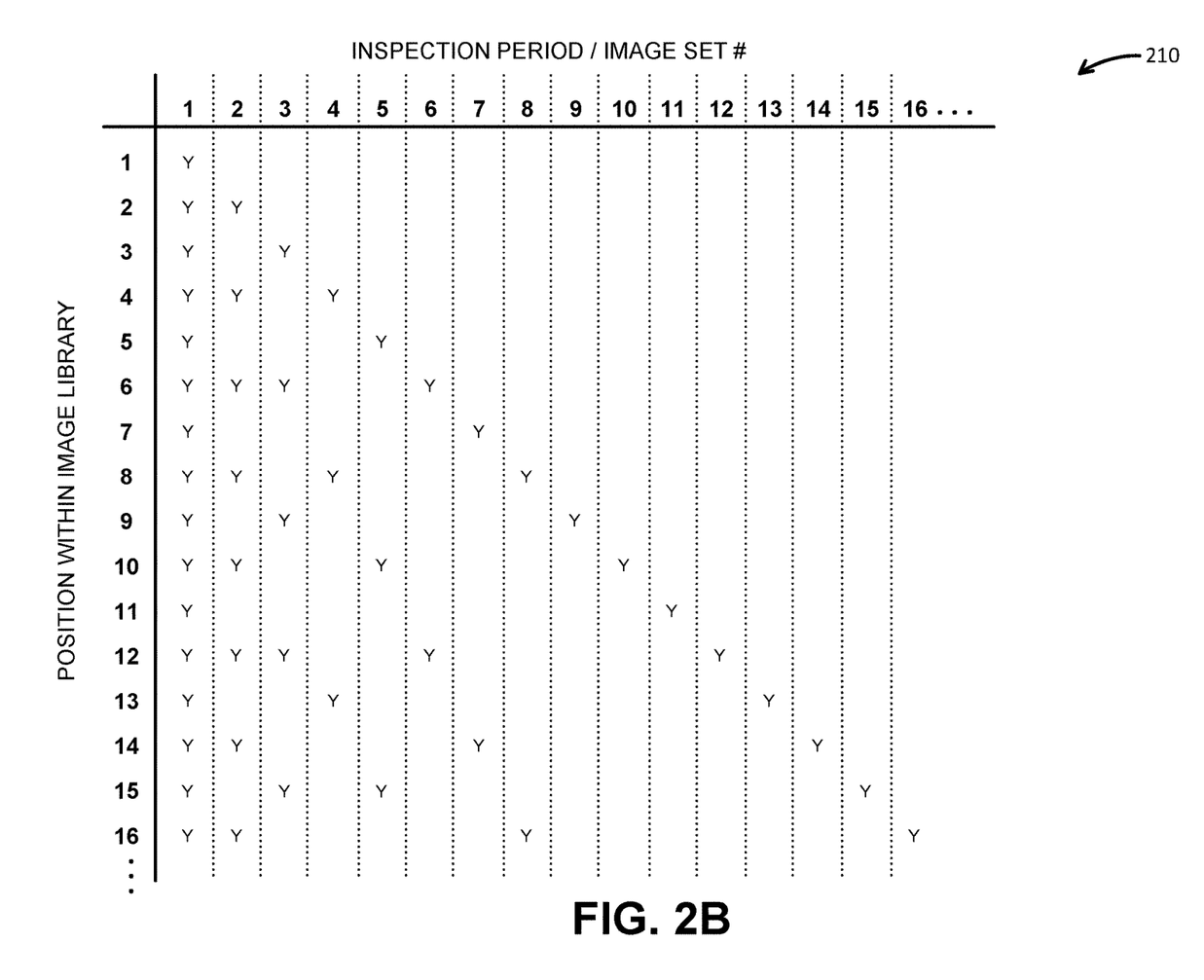
FIG. 2B is a table showing an example series of successive image replacement operations for an image library that may be performed when receiving the successive image sets of FIG. 2A.
Figure 2C:
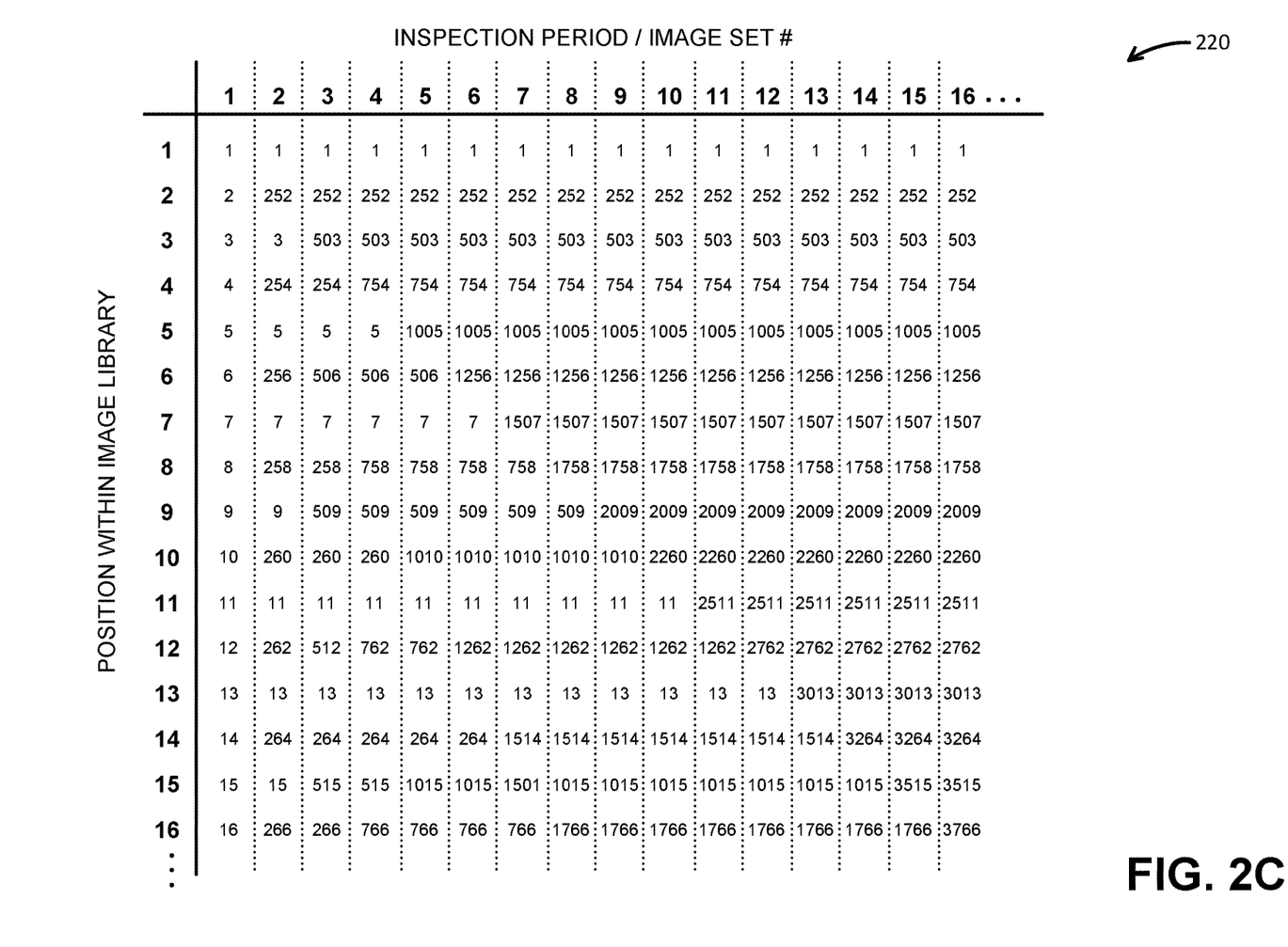
FIG. 2C is a table showing an example series of successive contents of the image library when receiving the successive image sets of FIG. 2A and applying the successive image replacement operations of FIG. 2B.

The operation of the algorithm described above is depicted in FIGS. 2A through 2C, in an embodiment where each of the image sets, and image library 134, each include 250 images. For readability, FIGS. 2A, 2B and 2C show only partial tables 200, 210 and 220, respectively. In each of tables 200, 210 and 220, the columns represent the time-ordered number of the inspection period and corresponding image set.

Referring specifically now to table 200 of FIG. 2A, each row represents the sequence number of a given image within the respective set of 250 images. The sequence number may represent the order in which the given image was received relative to the rest of the same image set. Alternatively, the rows may instead represent an arbitrary identifier assigned to the image within the respective image set (e.g., an identifier assigned by imaging equipment 102, by control module 126, by classification module 130, or by progressive update sampling module 136). The different values shown in the entries of table 200 represent unique images. The value may be the order in which the unique image was generated by imaging equipment 102 relative to all other images, the order in which imaging equipment 102 sent the unique image to computer 104, the order in which the unique image was processed by classification module 130, etc. Alternatively, the value may be an arbitrary identifier assigned to the image (e.g., as discussed above), subject to the temporal constraint that image numbers 1 through 250 were all generated by imaging equipment 102 during the first inspection period, image numbers 251 through 500 were all generated by imaging equipment 102 during the second inspection period, and so on.

Table 200 simply shows how images generated by imaging equipment 102 are arranged within each image set. For example, the first image set, which is generated by imaging equipment 102 during the first inspection period, includes 250 images labeled "1" through "250" (with only the first 16 being shown in FIG. 1 for clarity purposes). The second image set, which is generated by imaging equipment 102 during the next/second inspection period, includes another 250 images labeled "251" through "500" (again with only the first 16 being shown in FIG. 1), and so on.

Referring now to FIG. 2B, table 210 indicates which positions of image library 134 are updated for each new image set/inspection period. It is understood that the "position" represented by the rows of table 210 may be a purely logical construct, and need not mean that a particular memory location is involved. In table 210, a blank entry means that the corresponding position in image library 134 (as image library 134 exists at that time) is unchanged for the respective image set, while a "Y" indicates that the corresponding position in image library 134 is updated by replacing the current image with an image from the new image set.

In the example algorithm described above, for each position that is updated according to table 210, the image that has the corresponding sequence number in the new image set is used to replace the old entry. For the first image set, for instance, all 250 images of the first image set are used to populate image library 134. Thereafter, every second image of the second image set replaces the image currently in every second position of image library 134. Moving to the next inspection period, every third image of the third image set replaces the image currently in every third position of image library 134, and so on. This may continue as shown in table 210, and beyond.

Table 220 of FIG. 2C shows the contents of image library 134 that result from this approach, after each inspection period/image set. In table 220, each row represents a different position of image library 134 (as discussed above in connection with FIG. 2B), and each table entry represents a unique image (as discussed above in connection with FIG. 2A). Thus, the first column of table 220 represents the contents of image library 134 after updates are made based on the first image set but before updates are made based on the second image set, the second column of table 220 represents the contents of image library 134 after updates are made based on the second image set but before updates are made based on the third image set, and so on. As seen in FIG. 2C (with the understanding that the patterns shown would continue up to position number 250 in image library 134 if the rows of table 220 were not truncated), image library 134 contains a full complement of 250 images after the first image set is received, and contains a sampling of images that is quite evenly distributed across all of the image sets that have been received up until the current image set/inspection period.

If the columns of table 220 were not truncated in FIG. 2C, it would also be seen that both of these beneficial attributes remain in place at least for the first 250 inspection periods/image sets. To handle scenarios where the number of inspection periods and image sets can eventually exceed the number of entries in image library 134, the algorithm collectively implemented by progressive update sampling module 136 and progressive update recording module 140 may include additional steps. If image library 134 and each image set includes X entries, for example, a different algorithm may be used starting with the (X+1)-th image set. In one embodiment, for example, no images from the (X+1)-th image set are added to image library 134, one image form the (X+2)-th image set replaces the second image in image library 134, no images from the (X+3)-th image set are added to the library, one image from the (X+4)-th image set replaces the fourth image in image library 134, and so on. Further steps or modifications to the algorithm may also be required, depending on the number of image sets received. However, achieving the benefits of a full complement of images, and a well-diversified sampling of images, may be most important in the relatively early stages of developing an algorithm (e.g., over the initial lots), because fine tuning of ML model 132 may be more important in the earlier stages, and/or because there may be more need of troubleshooting in the early stages.

In some embodiments, each of the images in the algorithm described above (and each of the images represented in FIGS. 2A through 2C) is instead an image subset containing two or more images, e.g., with each subset being equal in size. Each subset may encompass all images that imaging equipment 102 generated for a particular lot sample, for example. In such embodiments, updates to image library 134 may be made one image subset at a time, rather than one image at a time as described above.

Figure 3:
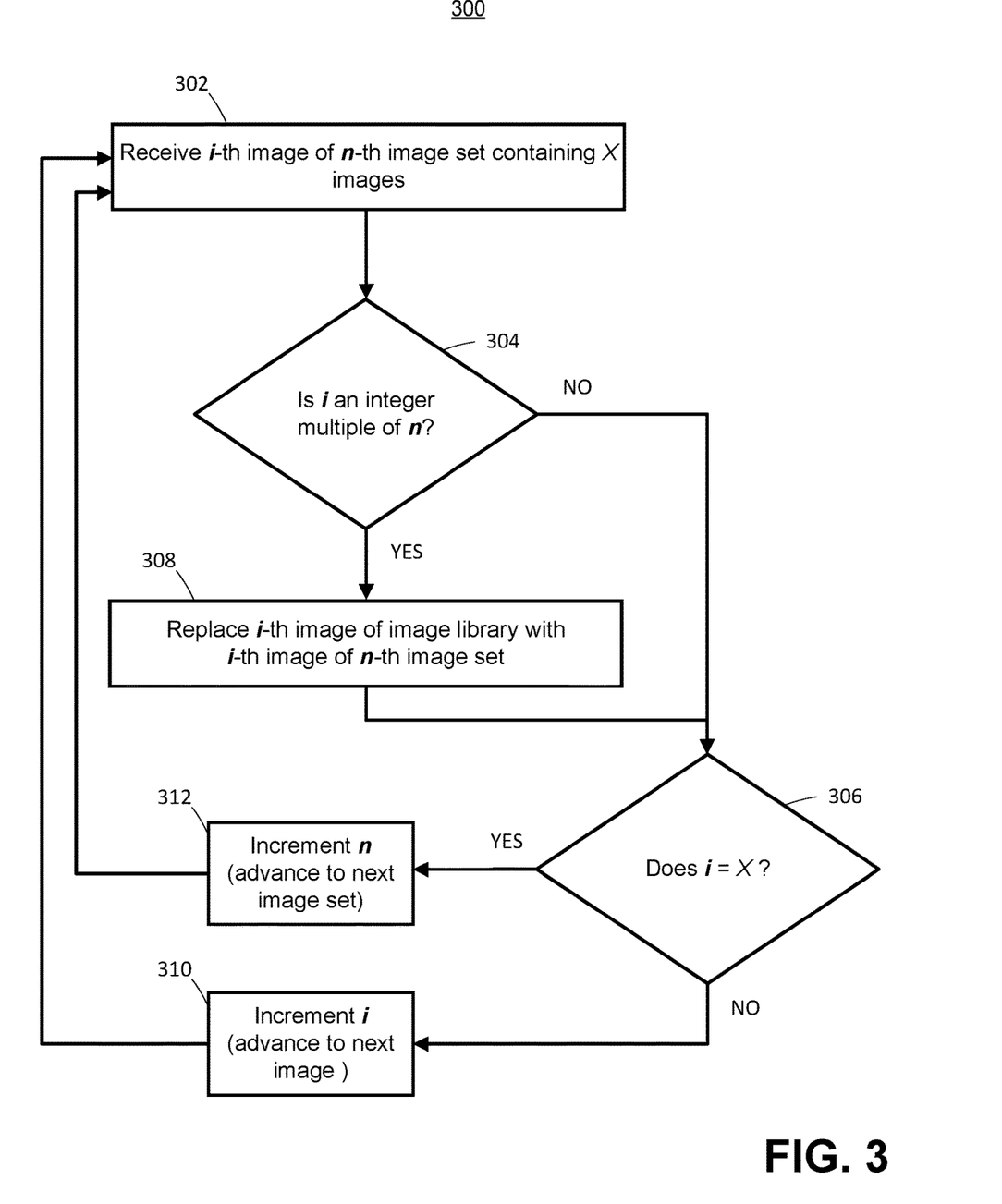
FIG. 3 is a flow diagram of an example algorithm for sampling images generated by automated imaging equipment.

FIG. 3 is a flow diagram of an example algorithm 300 for sampling images generated by automated imaging equipment, such as imaging equipment 102 (as automated/controlled by computer 104 via control module 126). Algorithm 300 may be collectively implemented by progressive update sampling module 136 of computer 104 and progressive update recording module 140 of database server 106, for example. In other embodiments, algorithm 300 may be implemented solely by computer 104 (e.g., in embodiments where image library 134 of FIG. 1 is local to computer 104), or solely by database server 106 (e.g., in embodiments where computer 104 transmits all images to database server 106, without first sampling specific ones of those images).

In the example algorithm 300, an i-th image an n-th image set is received at step 302 (e.g., by computer 104 from imaging equipment 102), where the n-th image set contains X images (e.g., 250 images, 1000 images, etc.). When algorithm 300 is initiated, both i and n are equal to 1. After step 302, flow proceeds to step 304. At step 304, it is determined whether i is an integer multiple of n. If not, flow proceeds to step 306. If i is an integer multiple of n, however, flow instead proceeds to step 308. At step 308, the i-th image of image library 314 is replaced with the i-th image of the n-th image set. After step 308, flow proceeds to step 306.

At step 306, it is determined whether i is equal to X. If not, flow proceeds to step 310, where i is incremented in order to advance to the next image within the current image set. If i is equal to X(i.e., the image set is complete), however, flow instead proceeds to step 312, where n is incremented in order to advance to the next image set. Regardless of whether step 310 or step 312 is implemented, flow then proceeds back to step 302. Steps 302 through 310 (or 312) may be iteratively repeated until the X-th image set is received, for example, at which time a different or modified algorithm may be applied.

It is understood that FIG. 3 corresponds to only one possible algorithm. In one alternative algorithm, for example, the image library is only updated once per image set, after the entire image set has been received. As another example, each "image" referred to in algorithm 300 is instead a subset of two or more consecutive images within the respective image set. As another example, rather than replace every n-th image in the image library, the algorithm may replace every (2n)-th image in the image library using every (2n)-th image in the current image set. As yet another example, the algorithm may replace every (X−n)-th image in the image library using every (X−n)-th image in the current image set (where X is the number of images in each image set and the image library). In still other examples, some degree of randomness may be introduced when determining which image(s) in the image library to replace, and/or when determining which image(s) in the image library will replace the old image(s). One of ordinary skill in the art will appreciate still other possibilities or variations for the algorithm that would remain in accordance with the principles disclosed herein.

Figure 4:
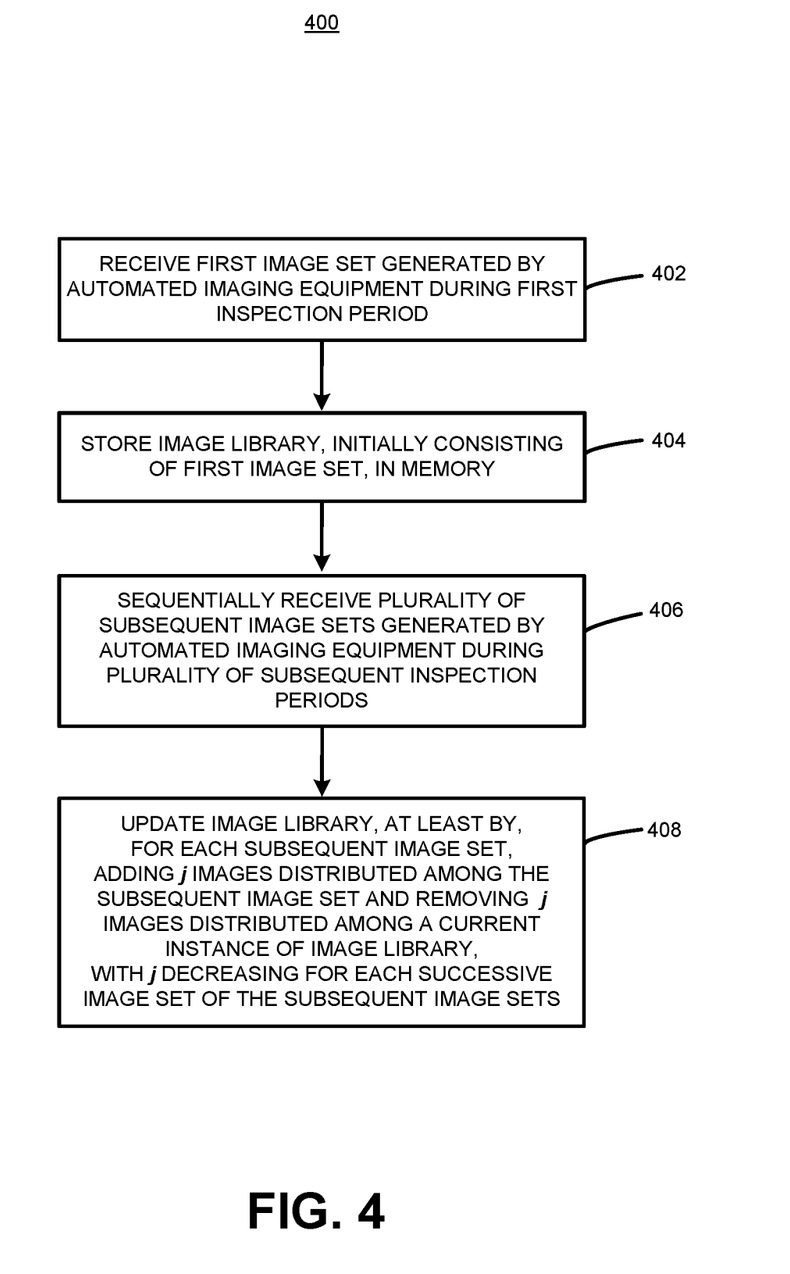
FIG. 4 is a flow diagram of an example method for sampling images generated by automated imaging equipment.

FIG. 4 is a flow diagram of an example method 400 for sampling images generated by automated imaging equipment, such as imaging equipment 102 (as automated/controlled by computer 104 via control module 126). Method 400 may be collectively implemented by progressive update sampling module 136 of computer 104 and progressive update recording module 140 of database server 106, for example. In other embodiments, method 400 may be implemented solely by computer 104 (e.g., in embodiments where image library 134 of FIG. 1 is local to computer 104), or solely by database server 106 (e.g., in embodiments where computer 104 transmits all images to database server 106, without first sampling specific ones of those images). The images may be of any type of item (e.g., syringes or other vessels containing fluids, empty vessels, etc.), and may be sampled/stored for any purpose (e.g., fine tuning and/or troubleshooting of a machine-learning model, and/or archival purposes, etc.), depending on the embodiment.

At block 402, a first image set is received. The first image set includes images that are or were generated by automated imaging equipment (e.g., imaging equipment 102 of FIG. 1, as automated/controlled by computer 104 via control module 126) during a first inspection period. The first inspection period may correspond to the analysis of only a first sample (e.g., product sample), or may otherwise correspond to the time it takes for the automated imaging equipment to capture some specific number of images (e.g., 250 images, or 1000 images, etc.). In some embodiments, all images of the first image set are images generated consecutively by the automated imaging equipment during the first inspection period.

At block 404, an image library is stored in a memory. When fully populated, the image library (e.g., image library 134 of FIG. 1) may contain the same number of images as the first image set. The memory may include any non-volatile or persistent memory device(s), such as an SSD or HDD memory, for example. As it is initially stored at block 404, the image library may consist of only the first image set. Block 404 may occur concurrently with block 402 (e.g., with each new image of the first image set being stored in the image library as soon as the new image is received), or may occur entirely after block 402 (e.g., in a batch process). In some embodiments, each image in the image library is stored with associated metadata indicating the time when the image was captured (or received, etc.) and/or the order in which that image was captured (or received, etc.) relative to other images in the same lot. The metadata may be received with the images at block 402, for example, or may be generated at block 404.

At block 406, subsequent image sets generated by the automated imaging equipment during subsequent inspection periods are sequentially received. Each of the subsequent image sets may contain the same number of images as the first image set and the image library. Each subsequent inspection period may correspond to analysis of a different sample, or may otherwise correspond to the time it takes for the automated imaging equipment to capture a particular number of images (e.g., the same number of images captured during the first inspection period). In some embodiments, all images of each subsequent image set are images generated consecutively by the automated imaging equipment during the respective inspection period.

At block 408, the image library stored in the memory is updated. The update process may include, for each subsequent image set, adding j images that are distributed among that image set to the image library and removing j images that are distributed among the current instance of the image library, where j is a positive integer that decreases for each successive image set. Additionally, in some embodiments, the number of images separating each of the j images (in both the image set and the image library) increases for each successive image set. In some embodiments, the update process at block 408 may include, for each image set received at block 406, adding to the image library every n-th image in the image set and removing from the image library every n-th image in the current instance of the image library, where n is the number of the inspection period during with the image set was generated by the automated imaging equipment. For example, the update process may follow the algorithm shown in FIG. 3, and/or follow the algorithm that corresponds to tables 200, 210 and 220 in FIGS. 2A through 2C. In some embodiments, as discussed above, each image added to the image library is stored with associated metadata indicating the time when the image was captured (or received, etc.) and/or the order in which that image was captured (or received, etc.) relative to other images in the same lot. The metadata may be received with the images at block 406, for example, or may be generated at block 408.

Alternatively, each update to the image library may involve the replacement of more than one image (i.e., an image subset). For example, the update process at block 408 may include, for each image set received at block 406, adding to the image library every n-th subset of two or more images in the image set, and removing from the image library every n-th subset of two or more images in the current instance of the image library, where n again is the number of the inspection period during with the image set was generated by the automated imaging equipment. Block 408 may occur concurrently with block 406 (e.g., with an update to the image library occurring at the time that each subsequent image set is received, and possibly with an update to a single image or image subset of the image library occurring each time that the n-th image, or image subset, of the n-th image set is received).

Depending on the embodiment, the different blocks described above may occur at different locations. For example, blocks 402 and 406 may occur at computer 104 of FIG. 1, while blocks 404 and 408 may occur at database server 106 of FIG. 1. Moreover, in some embodiments, method 400 includes one or more blocks that are not shown in FIG. 4. For example, method 400 may include an additional block in which some or all images in the current instance of the image library are used for a particular purpose, such as further training (e.g., "fine tuning") a machine-learning model (e.g., ML model 132 of FIG. 1), or for troubleshooting an inspection recipe, etc. As another example, method 400 may include an additional block (e.g., after block 408) in which all images associated with a lot are sorted according to the order in which those images were captured (or received, etc.).

Additional considerations pertaining to the above disclosure and the figures will now be addressed.

Some of the figures described herein illustrate example block diagrams having one or more functional components. It will be understood that such block diagrams are for illustrative purposes and the devices described and shown may have additional, fewer, or alternate components than those illustrated. Additionally, in various embodiments, the components (as well as the functionality provided by the respective components) may be associated with or otherwise integrated as part of any suitable components.

Embodiments of the disclosure relate to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

As used herein, the singular terms "a," "an," and "the" may include plural referents, unless the context clearly dictates otherwise.

As used herein, the terms "connect," "connected," and "connection" refer to an operational coupling or linking. Connected components can be directly or indirectly coupled to one another, for example, through another set of components.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes, tolerances and/or other reasons. There may be other embodiments of the present disclosure which are not specifically illustrated. The specification (other than the claims) and drawings are to be regarded as illustrative rather than restrictive. Modifications may be made to adapt a particular situation, material, composition of matter, technique, or process to the objective, spirit and scope of the present disclosure. All such modifications are intended to be within the scope of the claims appended hereto. While the techniques disclosed herein have been described with reference to particular operations performed in a particular order, it will be understood that these operations may be combined, sub-divided, or re-ordered to form an equivalent technique without departing from the teachings of the present disclosure. Accordingly, unless specifically indicated herein, the order and grouping of the operations are not limitations of the present disclosure.

What is claimed is:

1. A computer-implemented method for sampling images generated by automated imaging equipment, the method comprising:
    receiving a first image set generated by the automated imaging equipment during a first inspection period;
    storing an image library in a memory, the image library initially consisting of the first image set;
    sequentially receiving a plurality of subsequent image sets generated by the automated imaging equipment during a plurality of subsequent inspection periods; and
    updating the image library stored in the memory, wherein updating the image library stored in the memory includes, for each subsequent image set, adding to the image library j images distributed among the subsequent image set and removing from the image library j images distributed among a current instance of the image library, j being an integer greater than zero, and for each successive image set in the plurality of subsequent image sets, j decreases.

2. The computer-implemented method of claim 1, wherein each of (i) the image library, (ii) the first image set, and (iii) each of the plurality of subsequent image sets, includes a same number of images.

3. The computer-implemented method of claim 1, wherein:
    receiving a first image set includes receiving a first set of X images generated consecutively by the automated imaging equipment, X being an integer greater than one; and
    sequentially receiving the plurality of subsequent image sets includes, for each subsequent image set, receiving a new set of X images generated consecutively by the automated imaging equipment.

4. The computer-implemented method of claim 1, wherein updating the image library stored in the memory includes, for each subsequent image set, removing from the image library every $n^{th}$ image in the current instance of the image library, n being the number of the inspection period during which the subsequent image set was generated.

5. The computer-implemented method of claim 1, wherein updating the image library stored in the memory includes, for each subsequent image set, adding to the image library every $n^{th}$ image in the subsequent image set and removing from the image library every $n^{th}$ image in the current instance of the image library, n being the number of the inspection period during which the subsequent image set was generated.

6. The computer-implemented method of claim 1, wherein updating the image library stored in the memory includes, for each subsequent image set, adding to the image library every $n^{th}$ subset of Y images in the subsequent image set and removing from the image library every $n^{th}$ subset of Y images in the current instance of the image library, n being the number of the inspection period during which the subsequent image set was generated, and Y being an integer greater than one.

7. The computer-implemented method of claim 1, wherein:
    the memory is within, or communicatively coupled to, a server;
    receiving the first image set includes receiving the first image set at a computer;
    storing the image library in the memory includes sending the first image set to the server via a network, and storing, by the server, the first image set in the memory;
    sequentially receiving the plurality of subsequent image sets includes sequentially receiving the plurality of subsequent image sets at the computer; and
    updating the image library stored in the memory includes, for each subsequent image set,
        adding to the image library, by the server, the j images distributed among the subsequent image set, and
        removing from the image library, by the server, the j images distributed among the current instance of the image library.

8. The computer-implemented method of claim 1, wherein:
    receiving a first image set includes receiving a first set of X images generated consecutively by the automated imaging equipment, X being an integer greater than one;
    sequentially receiving the plurality of subsequent image sets includes, for each subsequent image set, receiving a new set of X images generated consecutively by the automated imaging equipment; and
    updating the image library stored in the memory includes, for each subsequent image set, adding to the image library every $n^{th}$ image or image subset in the subsequent image set and removing from the image library every $n^{th}$ image or image subset in the current instance of the image library, n being the number of the inspection period during which the subsequent image set was generated.

9. An automated visual inspection system comprising:
automated imaging equipment comprising one or more imagers and configured to capture images of samples;
a memory; and
one or more processors configured to
receive a first image set generated by the automated imaging equipment during a first inspection period,
store an image library in the memory, the image library initially consisting of the first image set,
sequentially receive a plurality of subsequent image sets generated by the automated imaging equipment during a plurality of subsequent inspection periods, and
update the image library stored in the memory, wherein updating the image library stored in the memory includes, for each subsequent image set, adding to the image library j images distributed among the subsequent image set and removing from the library j images distributed among a current instance of the image library, j being an integer greater than zero, and
for each successive image set in the plurality of subsequent image sets, j decreases.

10. The system of claim 9, wherein each of (i) the image library, (ii) the first image set, and (iii) each of the plurality of subsequent image sets, includes a same number of images.

11. The system 9, wherein:
the first image set includes a first set of X images generated consecutively by the automated imaging equipment; and
each subsequent image set includes a respective new set of X images generated consecutively by the automated imaging equipment.

12. The system of claim 9, wherein the one or more processors are configured to update the image library stored in the memory at least by, for each subsequent image set, removing from the image library every $n^{th}$ image in the current instance of the image library, n being the number of the inspection period during which the subsequent image set was generated.

13. The system of claim 9, wherein the one or more processors are configured to update the image library stored in the memory at least by, for each subsequent image set, adding to the image library every $n^{th}$ image in the subsequent image set and removing from the image library every $n^{th}$ image in the current instance of the image library, n being the number of the inspection period during which the subsequent image set was generated.

14. The system of claim 9, wherein the one or more processors are configured to update the image library stored in the memory at least by, for each subsequent image set, adding to the image library every $n^{th}$ subset of Y images in the subsequent image set and removing from the image library every $n^{th}$ subset of Y images in the current instance of the image library, n being the number of the inspection period during which the subsequent image set was generated, and Y being an integer greater than one.

15. The system of claim 9, wherein:
the system comprises (i) a computer that is communicatively coupled to the automated imaging equipment, and (ii) a server communicatively coupled to the computer via a network;
the one or more processors include (i) at least one processor of the computer and (ii) at least one processor of the server;
the memory is within, or communicatively coupled to, the server;
the at least one processor of the computer is configured to receive the first image set from the automated imaging equipment, send the first image set to the server via the network, sequentially receive the plurality of subsequent image sets, and for each subsequent image set, send only the j images distributed among the subsequent image set to the server via the network;
the at least one processor of the server is configured to add the first image set to the image library, and for each subsequent image set, add to the image library the j images distributed among the subsequent image set and remove from the image library the j images distributed among the current instance of the image library.

16. One or more non-transitory computer-readable media storing instructions that, when executed by one or more processors, cause the one or more processors to:
receive a first image set generated by automated imaging equipment during a first inspection period;
store an image library in a memory, the image library initially consisting of the first image set;
sequentially receive a plurality of subsequent image sets generated by the automated imaging equipment during a plurality of respective inspection periods; and
update the image library stored in the memory, wherein updating the image library stored in the memory includes, for each subsequent image set, adding to the image library j images distributed among the subsequent image set and removing from the image library j images distributed among a current instance of the image library, j being an integer greater than zero, and
for each successive image set in the plurality of subsequent image sets, j decreases.

17. The one or more non-transitory computer-readable media of claim 16, wherein each of (i) the image library, (ii) the first image set, and (iii) each of the plurality of subsequent image sets, includes a same number of images.

18. The one or more non-transitory computer-readable media of claim 16, wherein the instructions cause the one or more processors to update the image library stored in the memory at least by, for each subsequent image set, removing from the image library every $n^{th}$ image in the current instance of the image library, n being the number of the inspection period during which the subsequent image set was generated.

19. The one or more non-transitory computer-readable media of claim 16, wherein the instructions cause the one or more processors to update the image library stored in the memory at least by, for each subsequent image set, adding to the image library every $n^{th}$ image in the subsequent image set and removing from the image library every $n^{th}$ image in the current instance of the image library, n being the number of the inspection period during which the subsequent image set was generated.

20. The one or more non-transitory computer-readable media of claim 16, wherein:
the first image set includes a first set of X images generated consecutively by the automated imaging equipment, X being an integer greater than one;
each of the plurality of subsequent image sets includes a new set of X images generated consecutively by the automated imaging equipment; and
the instructions cause the one or more processors to update the image library stored in the memory at least by, for each subsequent image set, adding to the image library every $n^{th}$ image or image subset in the subsequent image set and removing from the image library every $n^{th}$ image or image subset in the current instance of the image library, n being the number of the inspection period during which the subsequent image set was generated.

* * * * *